(12) United States Patent
Bartlett

(10) Patent No.: US 7,739,875 B2
(45) Date of Patent: Jun. 22, 2010

(54) SYNGAS POWER SYSTEMS AND METHOD FOR USE THEREOF

(75) Inventor: Michael Bartlett, Munich (DE)

(73) Assignee: General Electric Company, Niskayuna, NY (US)

( * ) Notice: Subject to any disclaimer, the term of this patent is extended or adjusted under 35 U.S.C. 154(b) by 867 days.

(21) Appl. No.: 11/462,867

(22) Filed: Aug. 7, 2006

(65) Prior Publication Data

US 2008/0028765 A1 Feb. 7, 2008

(51) Int. Cl.
*F02C 3/28* (2006.01)
*F02C 3/30* (2006.01)
*F02C 6/18* (2006.01)

(52) U.S. Cl. .................. 60/780; 60/39.12; 60/39.182

(58) Field of Classification Search .................. 60/780, 60/39.12, 39.182, 39.464, 39.465
See application file for complete search history.

(56) References Cited

U.S. PATENT DOCUMENTS

| | | | | |
|---|---|---|---|---|
| 4,028,883 A * | 6/1977 | Meyer-Kahrweg | ......... | 60/39.12 |
| 4,199,933 A * | 4/1980 | Pfenninger | ......... | 60/39.12 |
| 4,695,442 A * | 9/1987 | Pinto et al. | ......... | 423/359 |
| 4,946,477 A * | 8/1990 | Perka et al. | ......... | 48/197 R |
| 5,289,676 A * | 3/1994 | Brown et al. | ......... | 60/39.12 |
| 6,061,936 A * | 5/2000 | Jahnke | ......... | 60/39.12 |
| 6,149,859 A * | 11/2000 | Jahnke et al. | ......... | 60/39.12 |
| 6,167,692 B1 * | 1/2001 | Anand et al. | ......... | 60/39.182 |
| 6,341,486 B2 * | 1/2002 | Hannemann et al. | ......... | 60/39.12 |
| 2002/0121093 A1 * | 9/2002 | Wallace et al. | ......... | 60/780 |
| 2002/0160238 A1 | 10/2002 | Labinov et al. | | |
| 2005/0089465 A1 | 4/2005 | Anumakonda et al. | | |
| 2006/0070587 A1 | 4/2006 | Bhalsora et al. | | |
| 2007/0006566 A1 * | 1/2007 | Dean et al. | ......... | 60/39.12 |

OTHER PUBLICATIONS

Andersen, Thormod, et al., Gas Turbine Combined Cycle with CO2-Capture Using Auto-Thermal Reforming of Natural Gas; Proceedings of ASME TURBO EXPO 2000: Land, Sea, and Air; May 8-11, 2000, Munich, Germany; 2000-GT-162; pp. 1-8.

Lozza, et al., Natural Gas Decarbonization to Reduce CO2 Emission from Combined Cycles. Part A: Partial Oxidation; Proceedings of ASME TURBOEXPO 2000; May 8-11, 2000, Munich Germany; 2000-GT-0163; pp. 1-8.

Lozza, Giovanni, et al., Natural Gas Decarboniation to Reduce CO2 Emission from Combined Cycles, Part B: Steam-Methane Reforming; Proceedings of ASME TURBOEXPO; 2000; May 8-11, 2000, Munich Germany; 2000-GT-0164; pp. 1-8.

* cited by examiner

*Primary Examiner*—Ted Kim
(74) *Attorney, Agent, or Firm*—Patrick K. Patnode

(57) ABSTRACT

In one embodiment, a power system comprises: a first compressor unit, a syngas generator in fluid communication with a fuel stream and the first compressor unit, a syngas expander unit configured to directly receive the first syngas stream from the syngas generator, a first steam generator, a water gas shift reactor, and a carbon dioxide removal unit. The first compressor unit is configured to compress an air stream and form a first pressurized stream, while the syngas generator is configured to generate a first syngas stream. The syngas expander is configured to reduce the pressure of the first syngas stream. The first steam generator is configured to cool the second syngas stream. The carbon dioxide removal unit configured to remove carbon dioxide from the converted syngas stream.

25 Claims, 2 Drawing Sheets

SYNGAS POWER SYSTEMS AND METHOD FOR USE THEREOF

BACKGROUND

This disclosure relates to a system and process of generating synthesis gas in a gas turbine combined cycle.

In many industrialized nations, power plants are subject to, or will become subject to, economic penalties for emission of various materials to the environment. For example, controls on carbon dioxide emissions results in emissions trading and taxes, and requires permits. As the cost of emission penalties increase, measures to curb emissions are continually sought, either as a retrofit to existing plants to reduce emissions and/or as a design of new carbon dioxide ($CO_2$)-lean power plants to lower overall emissions.

One $CO_2$ capture method is a fuel decarbonisation process, also known as a pre-combustion capture pathway. The process converts hydrocarbon (HC) fuels to a hydrogen-based fuel and carbon monoxide (e.g., synthesis gas or "syngas"). The carbon monoxide (CO) is then converted to carbon dioxide, which is removed from the system before the combustion process in the power plant.

A typical decarbonisation plant is highly complex as it involves many catalytic reactors such as a desulphurization reactor, pre-reformer, auto-thermal reformer and water-gas-shift reactor. Furthermore, the process is currently thermodynamically inefficient and costly. For example, a typical decarbonisation process often results in an 8-12% penalty in the overall plant efficiency due to the energy required and released during the reforming process. Thus, there is a strong need to create a more efficient decarbonisation system.

Traditionally, heat recovery in decarbonisation processes have involved generating low and high-pressure steam depending on the temperature level of the heat available. Steam has been preferred in the past because it is well known and widely used in the industry; however, alone, it is ineffective at significantly improving the efficiency of the process. Although energy is released during reformation at a temperature greater than about 800° C., this heat is recovered in the form of saturated steam at only about 200° C. to about 300° C. Saturated steam is generated to avoid metal temperatures in the region of about 500° C. to about 900° C.; which can result in metal dusting. This results in a large quantity of unused energy and large efficiency penalties. The steam is superheated in the exhaust gas of the combined cycle and low temperature heat is often rejected to either the environment or the low-pressure section of the steam bottoming cycle.

In order to meet emission goals, a power plant can employ a fuel decarbonisation system designed to minimize $CO_2$ emissions. These systems reform a hydrocarbon fuel (for example, natural gas) into a synthesis gas, comprising CO and $H_2$. Unfortunately, the reformation process results in a large penalty to the overall efficiency of a power plant primarily due to the loss of high temperature energy. Furthermore, low temperature heat may be rejected either to the environment or to a low-pressure section of a steam bottoming cycle. Therefore, a more efficient decarbonisation process is needed, which captures the high temperature heat energy released during reformation and utilizes the low temperature heat energy rejected throughout the cycle.

BRIEF DESCRIPTION

Disclosed herein are power systems and methods for operating power systems. In one embodiment, a power system comprises: a first compressor unit, a syngas generator in fluid communication with a fuel stream and the first compressor unit, a syngas expander unit configured to directly receive the first syngas stream from the syngas generator, a first steam generator, a water gas shift reactor, and a carbon dioxide removal unit. The first compressor unit is configured to compress an air stream and form a first pressurized stream, while the syngas generator is configured to generate a first syngas stream. The syngas expander is configured to reduce the pressure of the first syngas stream to a second syngas stream. The first steam generator is configured to cool the second syngas stream to a cooled syngas stream. The water gas shift reactor configured to convert carbon monoxide in the cooled syngas stream to carbon dioxide and to form a converted syngas stream. The carbon dioxide removal unit configured to remove carbon dioxide from the converted syngas stream and to form a carbon dioxide stream and a hydrogen stream.

In another embodiment, a power system comprises: a first compressor unit, a syngas generator, a syngas expander unit configured to receive the first syngas stream at a temperature of greater than or equal to about 900° C., a first steam generator, a water gas shift reactor, a carbon dioxide removal unit, and turbine unit.

In one embodiment, a method for operating a power system comprises: compressing an air stream to form a first pressurized stream and forming a first syngas stream by reacting the first pressurized stream and a fuel stream. The first syngas stream is introduced directly to a syngas expander which generates first power by expanding the first syngas stream to form a second syngas stream. Steam is generated and the second syngas stream is cooled to a cooled syngas stream. Carbon monoxide in the cooled syngas stream is converted to carbon dioxide to form a converted syngas stream. Carbon dioxide is removed from the converted syngas stream to form a carbon dioxide stream and a hydrogen stream.

The above-described and other features will be appreciated and understood from the following detailed description, drawings, and appended claims.

BRIEF DESCRIPTION OF THE FIGURES

Refer now to the figures, which are exemplary embodiments, and wherein the like elements are numbered alike.

DETAILED DESCRIPTION

A system that recovers high temperature heat released from a reforming process comprises a high temperature syngas expander (e.g., a syngas turbo-expander) in direct flow communication with a reformer unit. This direct flow enables the efficient use of high temperature heat from the reformer directly in the expander. In addition, the system can utilize low temperature heat in saturator (also known as "humidification tower" and "humidifier") to saturate a separated hydrogen stream, recovering the low temperature heat from trim cooler(s), intercooler(s), and/or condenser(s). The system recovers heat at various points to use the heat and attain an improvement in system electrical efficiency.

Figure 1:
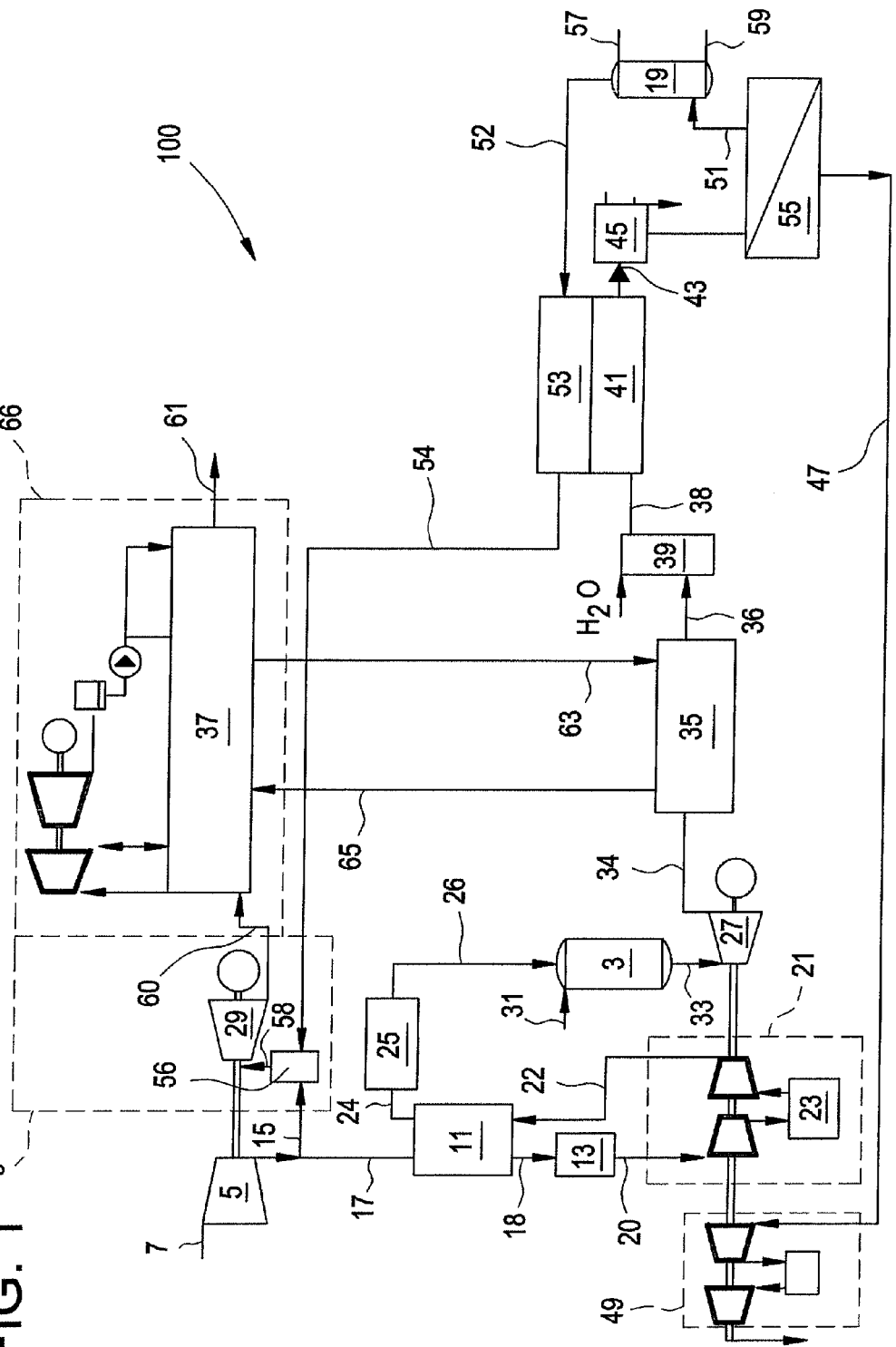
FIG. 1 is a schematic flow diagram of an embodiment using a saturator to saturate the syngas stream prior to entry into the gas turbine and after $CO_2$ removal and using a syngas turbo-expander directly after natural gas and air are converted to carbon monoxide and hydrogen.

In one exemplary embodiment, FIG. 1 illustrates a Gas Turbine Combined Cycle power system 100 comprising an ambient air stream 7 (e.g., an oxygen containing stream), which enters combined cycle 100 through compressor 5, is compressed from ambient conditions to a pressure of about 10 to about 50 bar, resulting in a temperature of about 250° C. to about 600° C. The air stream exiting compressor 5 is divided into a gas turbine air stream 15 that enters gas turbine unit 9 (e.g., including the compressor 5, combustor 56, and expander 29), and a syngas island air stream 17 that enters a heat exchanger 11 (e.g., high temperature heat exchanger). The syngas island air stream 17 releases heat in heat exchanger 11 which is absorbed by a pressurized air stream 22 from an air booster unit 21. The cooled air stream 18 exits heat exchanger 11 and enters a trim cooler 13 where it is further cooled by extracting low temperature heat from the cooled air stream 18, and optionally fully or partly using that heat in a saturator 19. The air stream 20 exiting the trim cooler 13 has a temperature of about 100° C. to about 300° C. and a pressure of about 10 bar to about 50 bar.

From the trim cooler 13, the air stream 20 enters the air booster unit 21 where it is compressed with compressor(s) and optionally intercooler(s) 23. The intercooler 23 can be employed to reduce the temperature of the air stream 20 between the compressor(s) and hence reduce the work required for compression. The heat rejected in 23 may be fully or partially used to drive the saturation process in saturator 19. The air stream 20 can be compressed in air booster unit 21 to a pressure of greater than or equal to about 60 bar, or, more specifically, to about 80 bar to about 200 bar, or, even more specifically, to about 80 bar to about 130 bar.

The pressurized air stream 22 exiting the air booster unit 21 can re-enter heat exchanger 11 where it is reheated by heat released from the syngas island air stream 17. Air stream 24 exits heat exchanger 11 at a temperature of about 200° C. to about 550° C. (e.g., about 400° C.) and at a pressure of about 60 bar to about 200 bar (e.g., about 110 bar) and enters air-stream preheater 25 to be further heated. The air-stream preheater 25 is a gas-gas heat exchanger that uses heat from the gas turbine unit 9 flue gas (not illustrated) to heat the air stream 24 to the desired inlet temperature of syngas generator 3, about 400° C. to about 650° C. (e.g., about 550° C.) and a pressure of about 60 bar to about 200 bar (e.g., about 110 bar).

From the heat exchanger 25, the heated, pressurized air stream 26 and a hydrocarbon fuel stream 31 enter syngas generator 3. The hydrocarbon fuel stream 31 can comprise various hydrocarbon fuel(s) that are capable of being converted to a syngas, such as natural gas. Natural gas refers to a mixture of gases that principally includes methane together with varying quantities of ethane, propane, butane, and other gases. The natural gas can enter the syngas generator 3 at an appropriate temperature, pressure, and flow rate that is specific to the syngas generator 3 (e.g. the type of syngas generator: partial oxidation gasifier, auto-thermal reformer, dry reformer, and so forth, as well as a combination comprising at least one of the foregoing). High pressure steam (not illustrated), e.g., from the steam bottoming cycle 66, is optionally introduced to the syngas generator at the appropriate temperature, e.g., about 300° C. to about 600° C. to hinder coking and increase hydrogen yield.

The syngas generator 3 can be any reformer capable of reacting natural gas with air to produce hydrogen and carbon monoxide, for example an auto-thermal reformer, a partial oxidation reformer, and/or dry reformer. The reforming process is illustrated by the equilibrium of the three global reforming reactions, as illustrated in Formulas I-III.

$$CH_4 + H_2O = 3H_2 + CO \qquad (I)$$

$$CH_4 + \tfrac{1}{2}O_2 = 2H_2 + CO \qquad (II)$$

$$CO + H_2O = H_2 + CO_2 \qquad (III)$$

The syngas stream 33 exiting syngas generator 3 comprises hydrogen ($H_2$) and carbon monoxide (CO), unreacted methane ($CH_4$), byproducts (e.g., water ($H_2O$) and carbon dioxide ($CO_2$)), plus other components present in the air, e.g., nitrogen ($N_2$) and Argon (Ar).

From the syngas generator 3, syngas stream 33 directly enters a syngas turbo-expander unit 27 where it is expanded to produce power, e.g., electricity. The syngas turbo-expander unit 27 recovers the high temperature energy released by the reforming process. The syngas stream 33 can be introduced to the syngas turbo-expander unit 27 a temperature of greater than or equal to about 900° C., or, more specifically, at a temperature of greater than or equal to about 1,050° C. For example, the syngas stream 33 directly enters a syngas turbo-expander unit 27 at a temperature of about 900° C. to about 1,400° C., or, more specifically, about 1,000° C. to about 1,300° C. (e.g., about 1,110° C.). The blades of the turbo-expander unit 27 can be cooled with recycled syngas (e.g., compressed from downstream), with steam, nitrogen, and/or otherwise, as well as with combinations comprising at least one of the foregoing coolants. The turbo-expander unit 27 can be located directly downstream from the syngas generator 3, to optimize heat recovery by expanding the syngas at its hottest point. The pressure ratio, and hence the gas temperature along with the cooling flows and configurations, can be chosen advantageously such that metal dusting of metal surfaces in the expander is avoided. Metal dusting can be prevalent at metal temperatures of 500° C. to 800° C. when in contact with reducing gas (e.g., syngas).

The remaining heat in syngas stream 34 can be used to generate high-pressure steam in a heat exchanger (i.e., steam generator 35) that heats high-pressure water 63 from the water/steam bottoming cycle 66. The syngas stream 34 exits the syngas turbo-expander unit 27 at temperature of about 300° C. to about 1,000° C. (e.g., about 800° C.) and, desirably, a pressure sufficient to move stream 34 through the remainder of the system 100 (e.g., about 20 bar to about 60 bar (such as about 26 bar)). In other words, the turbo-expander unit 27 reduces the pressure of the syngas stream 33 from about 55 bar to about 190 bar down to a pressure of about 20 bar to about 60 bar. This hot stream (syngas stream 34) enters the steam generator 35 where a thermal exchange with water stream 63 produces a steam stream 65 that is re-fed to the gas turbine heat recovery steam generator 37 for superheating. After the thermal exchange, the syngas stream 36 exiting the steam generator 35 has a temperature of about 150° C. to about 500° C. (e.g., about 250° C.).

From the steam generator 35, syngas stream 36 can be directed through an optional adiabatic quench unit 39. Here, excess water can be fed into the quench unit 39 in such a manner to increase the water concentration in the syngas stream 36, and decrease the temperature of the syngas stream to the adiabatic saturation temperature, e.g., about 100° C. to about 200° C. Exiting water, at the same temperature as the exiting gas, can be recirculated to the quench inlet along with make-up water. The water vapor imparted to the syngas stream by quench unit 39 can increase the yield of $CO_2$ in the water gas shift reactor 41 and thus, decrease overall plant emissions. Further, the quench unit can also serve to remove particles and contaminants from the syngas stream.

The water gas shift reactor 41, converts CO and $H_2O$ in the quench stream 38 to $CO_2$ and $H_2$ by a reaction as set forth in Formula IV:

$$CO + H_2O = CO_2 + H_2 \qquad (IV)$$

The water gas shift reactor 41 can comprise stage(s) with appropriate heat recovery 53 optionally disposed between the stages.

From the water gas shift reactor 41, the substantially CO-free stream 43 can optionally pass through a condenser 45 prior to entering a $CO_2$ removal unit 55 (e.g., a low temperature $CO_2$ removal unit) where the $CO_2$ product 47 is removed to produce a $H_2$-rich stream 51 diluted with $N_2$ and possibly comprising $H_2O$ and some small amounts of $CH_4$, CO, and/or $CO_2$. The condenser 45 reduces both the temperature and water content of the stream 43, which can improve the effectiveness of the low temperature $CO_2$ removal unit 55. The $H_2O$ removed from the stream 43 can be employed in the saturator 19. The heat rejected can also be used, partly or fully, to re-humidify the syngas in saturator 19. The $CO_2$ removal unit can comprise solvent(s) (e.g., amines), membranes, and so forth, that are capable from removing $CO_2$ from a gaseous stream.

In one exemplary embodiment, the water gas shift unit 41 can be integrated with a $CO_2$ membrane to extract the $CO_2$ and improve the $H_2$ yield. In this embodiment, the condenser 45 and saturator 19 can be eliminated, thereby decreasing the complexity of the system.

From the low temperature $CO_2$ removal unit 55, the $CO_2$ stream 47 passes to a carbon dioxide compressor unit 49 (e.g., an intercooled compressor train) where product $CO_2$ is compressed for export from the plant. This compressor train 49, can be disposed on the same shaft as the air booster unit 21 (which can also be intercooled and which is also referred to as the second compressor unit), and/or the syngas turbo-expander 27, thereby using the power from the expander to operate these components and eliminating other power systems. The heat rejected from the optional intercoolers can be partly or fully used in saturator 19.

Also exiting the low temperature $CO_2$ removal unit 55 is stream 51 that is rich in $H_2$. Stream 51 can be saturated with $H_2O$ in saturator 19. Heat recovered from the compressor train 49, trim cooler 13, air booster unit 21, and/or condenser 45, can be used efficiently in the saturator 19. Within the saturator 19, evaporating water into the gas increases the volume of stream 51, and therefore the power output of the gas turbine 9 and the amount of steam produced in the gas turbine heat recovery steam generator 37 increase. The fuel saturator 19 can be a counter-current contacting device between cold gas and hot water (e.g. packed bed tower, tray tower, and so forth) that increases the volume of the gas by combined heat and mass transfer. The saturator 19 increases the overall power output and efficiency of the cycle utilizing a non-adiabatic process by which the heat comes from a circulating hot water stream. Specifically, the hot water stream 57, from a water circuit that recovers heat from units 49, 13, 21 and/or 45, enters saturator 19 (e.g., at a temperature of about 100° C. to about 250° C., such as about 150° C.) and a cooled water stream 59 returns to the water circuit (e.g., at a temperature of about 50° C. to about 120° C., such as about 80° C.). Make-up water (not shown) maintains the water balance in the water circuit. As a result of this process, the exit saturated syngas stream 52 has a steam content of about 5 volume percent (vol %) to about 25 vol %, based upon the total volume of the stream 52.

From the saturator 19, the saturated stream 52 can be heated in heat recovery 53 via thermal exchange with the quenched stream 38 in the water gas shift reactor 41, e.g., the saturated stream 52 can be heated up to a temperature of about 200° C. to about 400° C. (e.g., to about 300° C.). From the heat recovery 53, the stream 54, along with second air stream 15, enters a combustor 56 in the gas turbine unit 9 of the power system 100. The very high temperature combustion stream 58 from the combustor 56 enters the expander 29 to produce power. The expanded stream 60 enters the heat recovery steam generator 37 of the steam bottoming cycle 66 that provides superheated steam at various pressures for expansion in the steam turbines. The resultant emission stream from the heat recovery steam generator 37 is a low $CO_2$ emissions exhaust stream 61. The exhaust stream 61 has a $CO_2$ concentration that is less than or equal to 5 volume percent (vol %), or, more specifically, less than or equal to 2.5 vol %, or, even more specifically, less than or equal to 1 vol %, based upon a total volume of exhaust stream 61.

Figure 2:
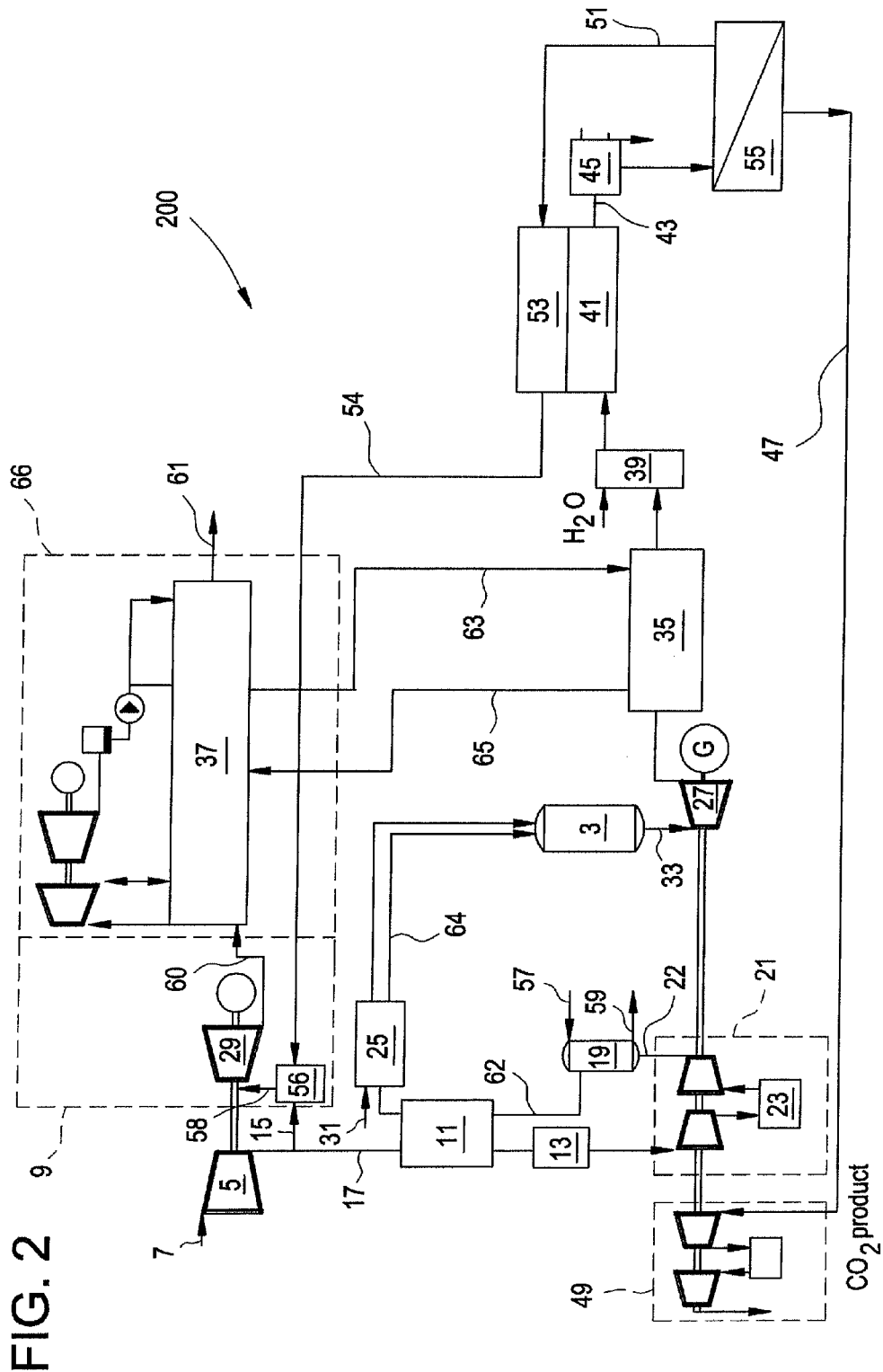
FIG. 2 is a schematic flow diagram of an embodiment using a saturator to saturate the air stream prior to entry into the syngas generator and using a syngas turbo-expander directly after natural gas and air are reformed to carbon monoxide and hydrogen.

In another embodiment, illustrated in FIG. 2, the saturator 19 can be disposed to receive air stream 22 from the air booster unit 21. In this embodiment, a saturated air stream 62 can pass through the heat exchanger 11, in thermal exchange with the air stream 17 prior to entering preheater 25. Also introduced to the preheater 25 can be the fuel stream 31 prior to both streams being introduced to the syngas generator 3. The saturated heated air stream 64 exits the preheater 25 at a temperature of about 400° C. to about 650° C., (e.g., about 550° C.) and at a pressure of about 60 bar to about 200 bar (e.g., about 110 bar). This exemplary embodiment has reaction advantages, e.g., the $H_2$ yield from the syngas generator 3 increases and coking via the Boudard mechanism in downstream units is hindered, thereby decreasing maintenance costs. From a plant perspective, the required inlet temperature of the quench unit 39 decreases for a given water vapor content in the shift unit 41, allowing more production of steam in steam generator 35 and increasing power output of the steam cycle. Further, more volume passes through the syngas gas turbo-expander 27, also generating more work, and the water balance in the syngas island is closed.

In an embodiment, the fuel stream 31 can be saturated in the saturator 19 while the air stream 22 is passed through heat exchanger 11 and preheater 25 prior to these streams entering the syngas generator 3. This exemplary embodiment improves the $H_2$ yield from the syngas generator 3, provides more volume through the syngas gas turbo-expander 27, produces more steam in the steam generator 35, results in a closed water circuit, and hinders coking.

The disclosed systems can compress air from the gas turbine island to a high pressure prior to generating syngas in a syngas generator. The heat released can be used to drive a syngas expander, generating power. The syngas island (portion of the system producing the syngas) is power-independent of the power island (gas turbine and steam turbine portions). The expansion ratio across the syngas expander (e.g., turbine) can vary from about 3 to about 120. Low temperature heat rejected from various system components (e.g., compressor intercooler(s), trim cooler(s), and/or syngas condenser) can be used in a fuel saturator prior to (e.g., upstream from) the gas turbine, boosting flow through the gas turbine expander and heat recovery steam generator (HRSG) and increasing power output and efficiency. Alternatively, or in addition, the fuel and/or air can be saturated prior to introduction to the syngas generator. This improves $H_2$ yield from the reforming process and provides greater volume to the syngas expander (e.g., greater power output) and more steam from the steam generator. The combination of the above measures gives an overall cycle efficiency penalty of 6-10 percentage points, depending on the $CO_2$ capture technology used, compared to 8-12 percentage points for existing, known configurations.

These systems effectuate heat recovery from the fuel decarbonization. In particular, a syngas expander is used to recover high temperature energy released by the reforming process, steam is used to recover medium temperature heat-syngas, and/or air/natural gas/syngas saturation is used to recover low temperature heat. Due to the system process and design, higher cycle efficiency is attained; efficiency of heat recovery is improved and the penalty of releasing fuel energy outside the main power cycle is minimized, thereby lowering cost. Heat recovery in the syngas island is more compact, decreasing equipment costs and plant footprint. Additionally, the syngas island is self-sufficient in terms of power, eliminating expensive power systems in the plant to run, e.g., the $CO_2$ compressor, thereby improving operability.

For example, a power generating system comprising a gas turbine unit, an auto-thermal reformer (e.g., syngas generator), steam generator, water gas shift reactor, and carbon dioxide separator, has a fuel input of 820 megawatts (MW) with a total output of 405 MW, and therefore an electrical efficiency of 49%. However, a system as is illustrated in FIG. 1 can have an electrical efficiency of 52.8%; a nearly 4 percentage point advantage.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). The terms "upstream" and "downstream" are intended to denote location based upon fluid flow, hence, a heat exchanger located downstream from a reactor would receive a stream after it had exited the reactor, and optionally after the stream had passed through other device(s). The term directly is intended to denote a flow that does not pass through other units; it goes from the first unit to the second unit (e.g., a heat exchanger located directly downstream from a reactor would receive a stream from the reactor without passing through other units (besides possible valves and sensors)).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A power system, comprising:
   a first compressor unit configured to compress an air stream and form a first pressurized stream;
   a syngas generator in fluid communication with a fuel stream and the first compressor unit and configured to generate a first syngas stream;
   a syngas expander unit configured to directly receive the first syngas stream from the syngas generator and to reduce a pressure of the first syngas stream to form a second syngas stream;
   a first steam generator configured to cool the second syngas stream to a cooled syngas stream;
   a water gas shift reactor configured to convert carbon monoxide in the cooled syngas stream to carbon dioxide and to form a converted syngas stream;
   a carbon dioxide removal unit configured to remove carbon dioxide from the converted syngas stream and to form a carbon dioxide stream and a hydrogen stream; and
   a gas turbine unit configured for receiving the hydrogen stream and for generating power.

2. The power system of claim 1, further comprising a carbon dioxide compressor unit configured to compress the carbon dioxide stream and form a carbon dioxide product stream.

3. The power system of claim 2, wherein the carbon dioxide compressor unit and the syngas expander unit are mechanically connected to a common shaft.

4. The power system of claim 1, wherein the first compressor unit further comprises:
   a first compressor configured to compress the air stream to produce a first compressed air stream;
   a first heat exchanger configured to cool the first compressed air stream to a cooled air stream;
   a cooler configured to further cool the cooled air stream to a cooler air stream; and
   a second compressor unit configured to compress the cooler air stream to a second compressed air stream, wherein second compressor outlet is in fluid communication with the first heat exchanger that is configured to heat the second compressed air stream and to form the first pressurized stream.

5. The power system of claim 4, wherein the second compressor unit is mechanically connected to the common shaft.

6. The power system of claim 1, further comprising a saturator located upstream of the gas turbine unit, and configured to introduce water vapor to the hydrogen stream.

7. The power system of claim 6, further comprising a heat recovery unit located downstream of the saturator and upstream of the gas turbine unit, and configured to heat the hydrogen stream with heat from the water gas shift reactor.

8. The power system of claim 6, wherein the saturator is in thermal communication with a component selected from the group consisting of a cooler, a carbon dioxide compressor unit, a second compressor unit, and combinations comprising at least one of the foregoing components.

9. The power system of claim 1, further comprising a quench unit located upstream of the water gas shift reactor and configured to introduce water to the cooled syngas stream.

10. The power system of claim 1, further comprising a saturator located upstream of the syngas generator and configured to saturate the first pressurized stream with water vapor.

11. The power system of claim 10, further comprising a carbon dioxide compressor unit configured to compress the carbon dioxide stream and form a carbon dioxide product stream.

12. The power system of claim 11, wherein the carbon dioxide compressor unit and the syngas expander unit are mechanically connected to a common shaft.

13. The power system of claim 10, wherein the first compressor unit further comprises:
a first compressor configured to compress the air stream to produce a first compressed air stream;
a first heat exchanger configured to cool the first compressed air stream to a cooled air stream;
a cooler configured to further cool the cooled air stream to a cooler air stream; and
a second compressor configured to compress the cooler air stream to the first pressurized stream.

14. The power system of claim 13, wherein the second compressor unit is mechanically connected to the common shaft.

15. A method for operating a power system, comprising:
compressing an air stream to form a first pressurized stream;
forming a first syngas stream by reacting the first pressurized stream and a fuel stream;
introducing the first syngas stream directly to a syngas expander;
generating first power by expanding the first syngas stream to form a second syngas stream;
generating steam and cooling the second syngas stream to a cooled syngas stream;
converting carbon monoxide in the cooled syngas stream to carbon dioxide and forming a converted syngas stream;
removing carbon dioxide from the converted syngas stream and forming a carbon dioxide stream and a hydrogen stream; and
introducing the hydrogen stream to a gas turbine unit and generating second power.

16. The method claim 15, further comprising compressing the carbon dioxide stream with a carbon dioxide compressor unit and forming a carbon dioxide product stream.

17. The method of claim 16, operating the carbon dioxide compressor unit with the first power.

18. The method of claim 15, further comprising saturating the first pressurized stream with water vapor prior to forming the first syngas.

19. The method of claim 15, wherein:
the first pressurized stream has a pressure of about 60 bar to about 200 bar;
the second syngas stream has a pressure of about 20 bar to about 60 bar; and
the cooled syngas stream has a temperature of about 150° C. to about 500° C.

20. The method of claim 15, wherein the first syngas is introduced to the syngas expander at a temperature of greater than or equal to about 900° C.

21. The method of claim 20, wherein the temperature is greater than or equal to about 1,050° C.

22. The method of claim 15, further comprising cooling the syngas expander with a coolant selected from the group consisting of recycled syngas, steam, nitrogen, and combinations comprising at least one of the foregoing coolants.

23. The method of claim 15, further comprising introduce water vapor to the hydrogen stream using a saturator prior to introducing the hydrogen stream to the gas turbine unit, wherein the saturator recovers heat from a component selected from the group consisting of a cooler, a carbon dioxide compressor unit, a second compressor unit, and combinations comprising at least one of the foregoing components.

24. A power system, comprising:
a first compressor unit configured to compress an air stream and form a first pressurized stream;
a syngas generator in fluid communication with a fuel stream and the first compressor unit and configured to generate a first syngas stream;
a syngas expander unit configured to receive the first syngas stream at a temperature of greater than or equal to about 900° C., and to reduce the pressure of the first syngas stream to a second syngas stream;
a first steam generator configured to cool the second syngas stream to a cooled syngas stream;
a water gas shift reactor configured to convert carbon monoxide in the cooled syngas stream to carbon dioxide and to form a converted syngas stream;
a carbon dioxide removal unit configured to remove carbon dioxide from the converted syngas stream and to form a carbon dioxide stream and a hydrogen stream; and
a gas turbine unit configured for receiving the hydrogen stream and for generating power.

25. The power system of claim 24, wherein the temperature is greater than or equal to about 1,050° C.

* * * * *